US010841171B2

(12) United States Patent
Saxena et al.

(10) Patent No.: US 10,841,171 B2
(45) Date of Patent: Nov. 17, 2020

(54) METHOD AND SYSTEM FOR VIRTUAL NETWORK SERVICE ACTIVATION

(71) Applicant: Infosys Limited, Bangalore (IN)

(72) Inventors: Gaurav Saxena, Bangalore (IN); Devendra Singh Rawat, Bangalore (IN); Kishore Thota, Guntur (IN)

(73) Assignee: INFOSYS LIMITED, Bangalore (IN)

( * ) Notice: Subject to any disclaimer, the term of this patent is extended or adjusted under 35 U.S.C. 154(b) by 101 days.

(21) Appl. No.: 16/183,472

(22) Filed: Nov. 7, 2018

(65) Prior Publication Data
US 2019/0386886 A1 Dec. 19, 2019

(30) Foreign Application Priority Data
Jun. 14, 2018 (IN) .............................. 201841022332

(51) Int. Cl.
  *H04L 12/24* (2006.01)
  *H04L 12/46* (2006.01)
  *H04L 29/08* (2006.01)

(52) U.S. Cl.
  CPC .......... *H04L 41/14* (2013.01); *H04L 12/4641* (2013.01); *H04L 67/16* (2013.01)

(58) Field of Classification Search
  CPC ..... H04L 41/14; H04L 12/4641; H04L 67/16; H04L 67/02; H04L 67/10; H04L 41/0869; H04L 41/5009; H04L 41/5048
  USPC ......................................................... 709/224
  See application file for complete search history.

(56) References Cited

U.S. PATENT DOCUMENTS

| | | | |
|---|---|---|---|
| 7,609,647 B2 | 10/2009 | Turk et al. | |
| 8,116,757 B2 | 2/2012 | Sharaga et al. | |
| 8,255,509 B2 | 8/2012 | Draca et al. | |
| 10,089,130 B2 * | 10/2018 | Kim ...................... | G06F 9/452 |
| 2009/0181665 A1 | 7/2009 | Sater et al. | |
| 2015/0326535 A1 | 11/2015 | Rao et al. | |
| 2016/0057075 A1 | 2/2016 | Parikh et al. | |
| 2016/0285703 A1 | 9/2016 | Joe et al. | |
| 2017/0078216 A1 | 3/2017 | Adolph et al. | |
| 2017/0141970 A1 | 5/2017 | Adkins et al. | |

(Continued)

FOREIGN PATENT DOCUMENTS

| | | |
|---|---|---|
| KR | 1579009 B1 | 12/2015 |
| WO | 2015026785 A2 | 2/2015 |

OTHER PUBLICATIONS

European Search Report for EP Application No. 18207426.0-1216, dated Apr. 25, 2019.

(Continued)

*Primary Examiner* — Tu T Nguyen
(74) *Attorney, Agent, or Firm* — Troutman Pepper Hamilton Sanders LLP (Rochester)

(57) ABSTRACT

The disclosure provides activation of end to end virtual network services, along with various validations. This technology uses model driven architecture to convert the configurations to VNF/PNF specific commands and abstract the complexity of different types of syntax & command lines. This technology also provides test and diagnostic functionality including service connectivity check, performance, rate-limiting at each step of configuration at virtual infrastructure and functional level. Once the VNS is successfully applied, the configuration will be updated in database which can be referred for any future updates.

20 Claims, 7 Drawing Sheets

(56) References Cited

U.S. PATENT DOCUMENTS

2017/0222889 A1\* 8/2017 Zong .................. H04L 41/5051
2017/0279702 A1   9/2017 Mah et al.
2019/0339955 A1\* 11/2019 Kuo ........................ G06F 9/485

OTHER PUBLICATIONS

European Search Report for EP Application No. 18207426.0-1216, dated Sep. 9, 2019.

\* cited by examiner

Virtualized Network Serice Activation Tool

FIG 4a

Virtualized Network Serice Activation Tool

End to End Ethernet VPN Service

METHOD AND SYSTEM FOR VIRTUAL NETWORK SERVICE ACTIVATION

This application claims the benefit of Indian Patent Application Serial No. 201841022332, filed Jun. 14, 2018, which is hereby incorporated by reference in its entirety.

FIELD

This technology relates to activating services over a virtual network. More particularly, this technology relates to activating end to end virtual network service, along with multiple validations.

BACKGROUND

In legacy networks, service providers offer different types of services like broadband, MPLS VPN, VOIP over their physical network infrastructure devices like switches, routers etc. These physical devices are from different equipment vendors and have defined set of installation & configuration process specific to vendor equipment types. Because of physical infrastructure, setting up the services and physical connectivity is simpler.

In SDN/NFV the software (Virtual Network Function/VNF) is decoupled from the hardware to ensure there is no vendor proprietary hardware dependency and further data plane is decoupled from control plane to have centralized control of network, rather than distributed control by each devices. A service provider needs to instantiate the VNFs as virtual machine over cloud based infrastructure for example Openstack, VM Ware etc and do required configurations starting from virtual resources like CPU, memory and virtual network to service configuration for service function chaining. To offer services like Broadband, MPLS VPN, VOIP service providers need to ensure cloud infrastructure is in place, VMs are created, VNFs are instantiated & configured, virtualized network setup is in place to interconnect the VMs, Service function chaining is configured and service is activated and tested end to end.

Therefore, initial configurations of VNF's as well as each and every change has to be analyzed before applying the configurations. Different command syntaxes of different VNF's in multi-vendor network needs also needs to be learned. Upgrading network configurations can cause network outages because of manual errors. Most configuration changes must be synchronized across multiple VNF's. An error on a single VNF among thousands in the network can send data into a dead end.

Accordingly, there is a need for a method and system for activation of end to end network service along with validations.

SUMMARY

The disclosure provides a system for implementing an architecture for network service activation. This technology has a layer architecture comprising: a client browser layer; a UI helper layer; a business logic layer; and a source system layer. The source system layer is configured to apply a predefined configuration on one or more vendor network systems of a virtual network service using orchestrators which: perform a diagnosis of the vendor network systems; perform a verification of the virtual network service; and activate the virtual network service based on the verification and the diagnosis.

The disclosure further provides a method for activation of virtual network service. This method includes parsing a received request from a customer into one or more child templates. One or more vendor network system and virtual network services to be configured are identified, from the child templates. The identified vendor network systems are connected using configurations provided by the customer. The method further includes: performing a diagnosis on the connected vendor network systems; performing a healing function on the connected vendor network systems; and activating the identified virtual network service based on the diagnosis and the healing functions.

The disclosure further provides a computer readable medium for activation of virtual network service. The processor is configured for: parsing a received request from a customer into one or more child templates; identifying one or more vendor network systems and a virtual network service to be configured, from the child templates; connecting the identified one or more vendor network systems using configurations provided by the customer; performing a diagnosis on the connected one or more vendor network systems; performing a healing function on the connected one or more vendor network systems; and activating the identified one or more vendor network systems based on the diagnosis and the healing functions.

DETAILED DESCRIPTION

The present disclosure provides for activating an end to end virtual network service which includes diagnostic and self-healing. This technology is independent of the type of vendor network elements used in the network.

Figure 1:
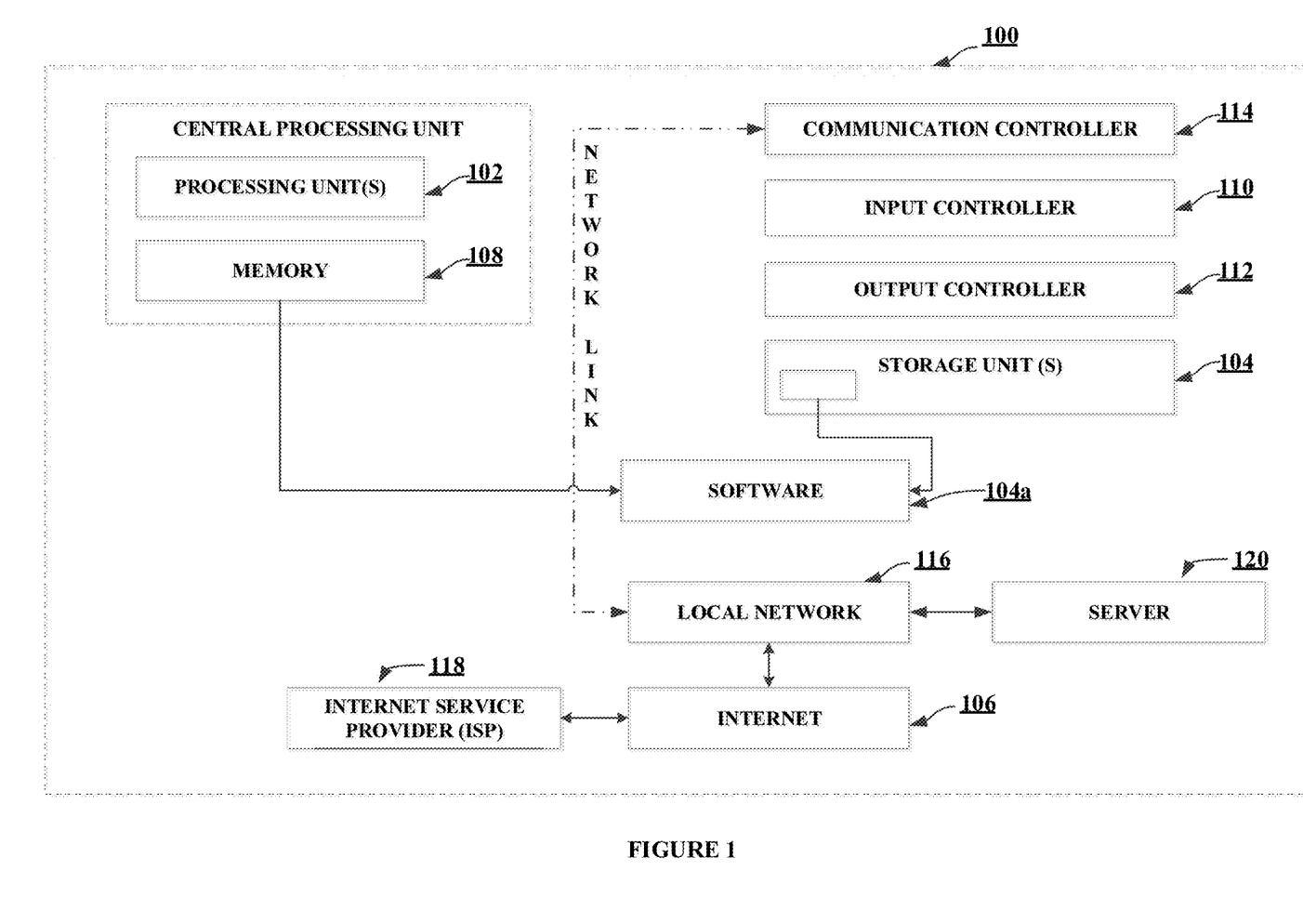
FIG. 1 relates to a general purpose computer system which can be used for any of the described embodiment.

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106.

The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

One embodiment, of the disclosure allows network operators to create/update end to end network service configurations without delving into the intricacies of Virtual Network Services. (VNS) spreading across multiple domains (Enterprise/Retail) or different VNF's/PNF's. In an embodiment, this disclosure will provide a user interface as well as REST based north-bound API for operators or network functions virtualization orchestrator (NFVO)/virtual network functions manager (VNFM) to provide the VNS details in TOSCA/YANG format. Users will be able to attach various service configurations in a generic way for each VNF/PNF. In an embodiment, the disclosure will use model driven architecture to convert the configurations to VNF/PNF specific commands and abstract the complexity of different types of syntax & command lines. For south-bound interaction an adapter architecture will be provided which will allow different VNF/PNF to plug-in seamlessly. One embodiment of the disclosure will also provide test & diagnostic functionality for example: service connectivity check, performance, rate-limiting at each step of configuration at virtual infrastructure and functional level. Once the VNS is successfully applied, the configuration will be updated in database which can be referred for any future updates.

In one embodiment, the architecture implementing this disclosure is a 4 tier model comprising:
 i. Client Browser layer
 ii. UI Helper Layer
 iii. Business Logic Layer
 iv. Source System Layer Client Browser Layer is the browser on which the client is operating on.

UI Helper Layer provides the UI through which a user creates a request for a service activation, and gets notification for the activation, or if any error.

Business logic layer is the separation between the UI and the data repositories, and implements the business rules if any. Business logic layer simplifies maintenance and integration of new components and subsystems.

The source system layer comprises of the components specific to this disclosure. The components are described in detail along with the explanation of FIG. 3 below. The source systems are the PNFs/VNF's from which data is being pushed/fetched through adaptors.

Figure 3:
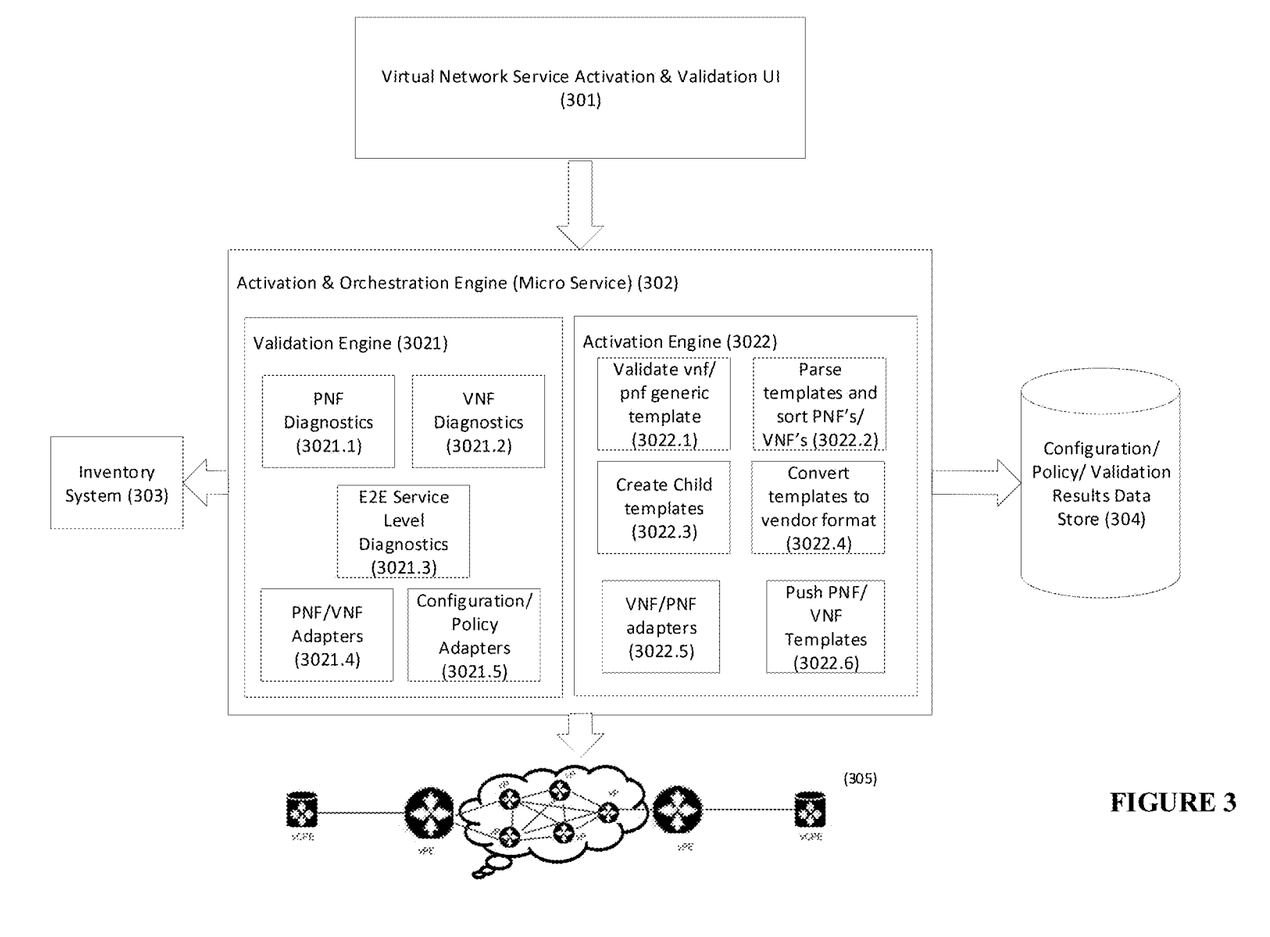
FIG. 3 is a system describing an example of a system for implementing the present disclosure, along with the functionality of each of the components of the system.

Following is a description of FIG. 3 explaining an embodiment of a system for implementing the present disclosure, along with the functions of various components therein. In one embodiment, the user interface (301) connects to Activation & Orchestration Engine (AO) (302). The Activation Engine (AE) (3022) will be the brain of AO. The AO engine exposes the REST API's to perform the CRUD operations of the service—Create, read, Update, Delete. The AO engine may also provide integration among different AO components like validation engine (VE) (3021), template converter (3022.4) & adaptor layer via a messaging layer in an architecture for the present disclosure. This is implemented using Spring Boot & Spring REST modules. Role Based Access Control (RBAC) is used to authenticate & authorize the users accessing REST API. All operations are logged to database to provide auditing functionality.

In one embodiment, the Validation Engine (VE) may perform multiple checks on the integrity of the templates and verification of the service. The validation (3022.1) may comprise:
 a. Verify the syntax, network topology and forwarding chains of the service based on pre-defined rules;
 b. Verify the availability of PNF/VNF and required ports/interfaces referenced in templates. This may be done by referring to service and device inventory system (303);
 c. Verify the values of different network parameters to ensure they are within the boundary limits. The boundary limits are fetched from the network element specific inventory; and
 d. Verify if the implementation of this service does not affect existing services. This may be done by referencing the service inventory to verify if the requested ports on network elements are available.

The VE may push the templates with positive validation result to the calling component queues.

In one embodiment, the Template Converter (TC) (3022.4) is responsible for creation of the child templates. The child templates correspond to southbound systems. The flow for TC may be:
 a. Parse the template to fetch the various Southbound systems depending on the device type (3022.2);
 b. Fetch device specific templates from device inventory;
 c. Create the child templates by filling the relevant data to device templates (3022.3);

d. Push the templates to VE queues;
e. On successful validation put the templates on diagnosis queues (3021.1, 3021.2 & 3021.3); and
f. On successful validation put the templates on adapter queues (3021.4 & 3021.5)

The PNF/VNF adapters and configuration/Policy adapters (3021.4, 3021.5 & 3022.5) are the way to provide an open pluggable architecture for integrating with southbound systems. PNF/VNF adapters and configuration/Policy adapters (3021.4, 3021.5 & 3022.5) will be responsible to:
  a. Provide a communication with downstream system. The downstream system could be the PNF/VNF or an EMS/VNFM. The communication might be via REST API/SNMP/SSH/Netconf etc; and
  b. Convert the child templates into specific commands depending on the protocol.

In one embodiment, the VNF/PNF adapters (3022.5) in the Activation Engine contains the functions for creation & activation of VNF's/PNF's. They push the vendor specific VNF/PNF configuration or policy templates into the VNF's/PNF's (3022.6). The adapters in the validation Engine (3021.4) contains the functions related to the validation & verification of the VNF's/PNF's.

The adapters have the following flow:
Fetch the child templates from specific queues;
Convert them to downstream system specific language; and
Apply the changes to PNF/VNF and provide response back to AO via queues.

In one embodiment the end to end Service Level Diagnostic component (SD) (3021.3) is responsible for performing diagnostic on the PNF/VNF. The diagnosis is divided into two main phases:
  a. Phase one is done to verify the state of the devices involved. The tests executed varies from ping to checking the load limits (cpu, mem, disk).
  b. Phase two corresponds to service level diagnosis which are composed of various tests like Connectivity, Bandwidth & Performance checks etc.

The SD also communicates with external Alarm correlation system to verify VNF/PNF status.

In one embodiment, the data store (304), contains the data related to configurations, policies and Validation results. The data store (304) also may hold the configuration backup which would be taken every day.

The data store may contain three types of templates related to the VNF/PNF service specific configurations—
Generic templates for a VNF/PNF type;
PNF/VNF Vendor specific templates; and
Templates with the real configurations specific to vendor VNF's/PNF's for a customer.

The data store may also hold policies related to customers, which are to be applied and modified on the fly. The policies may relate to routing, bandwidth, class of service and self-healing.

The data store may also hold the validation test results at the resource and service level. Test results are stored in the Data store after every validation either before or after activation.

The validated and converted templates are then used to configure the virtual network (305).

Figure 2A:
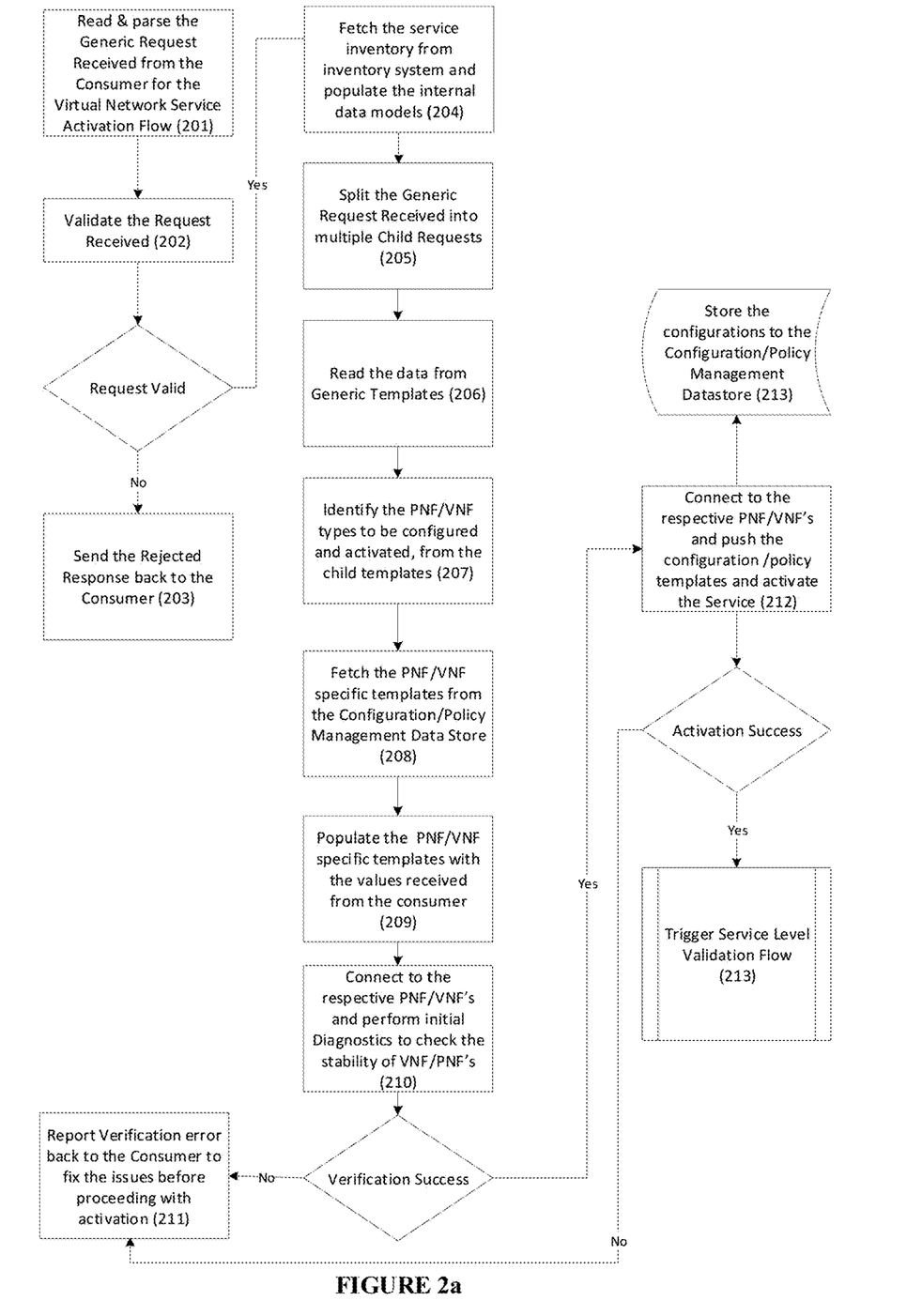
FIG. 2a is a flowchart of an example of a process described herein.

The functionalities of the above system will be described in detail in FIGS. 2a and 2b. In one embodiment, a user sends request for virtual network service activation using the UI mentioned in the description of FIG. 2a. Along with the request, the user can submit a service ID (201). The AO engine will access the inventory and fetch corresponding network topology and configuration details of the VNF/PNF (201). Once the corresponding information is fetched, the details maybe filled in a template. These templates may be configuration templates, corresponding to the different VCNF/PNF. The process step (201) may also include parsing the template where the configuration details are filled. Once the template is parsed, the different VNF/PNF details are separated. In step (202), the template/parsed information is validated by the Activation & Orchestration Engine (AO Engine). The validation may include checking for correct mapping of VNF/PNF elements, and correct format of template. The validations may also include whether the configurations and policies templates have been applied as per the actual service configurations. Another validation may include if all VNF's/PNF's are activated successfully and able to see the traffic from end to end.

In an embodiment, if the template validation fails the service request is rejected. The rejected request may be sent back to the user (203).

If the template validation is successful at step (202), then fetch the service inventory from inventory system and populate the internal data models (204). The data may be populated into Generic templates and these can be pushed onto the vendor VNF's/PNF's.

In an embodiment, the validated template maybe then split into one or more child templates (205). In one embodiment AO engine may use model-driven data modelling to split the validated template into child templates. There are some preconfigured models, and the child templates can be mapped to any of the existing models dynamically.

The child template may then be scanned for information. In one embodiment, a set of VNF/PNF adapters may convert the child template into vendor specific format. Some of the formats may be TOSCA, YANG, XML, OpenFlow, SNMP, or CII. (206, 207).

The PNF/VNF specific templates maybe then fetched from the Configuration or Policy Management Data Store (208), as per the information fetched from the child template. The data store may contain information about the configurations and templates, policies, and validations.

In one embodiment, these specific templates maybe filled with the parameter values provided by the user while submitting the request (209).

These values maybe then used to connect to the respective PNF/VHF's and perform initial Diagnostics to check the stability of VNF/PNF's (210). An initial analysis maybe performed by the AO engine to check the stability.

In one embodiment if the validation is successful, connection to the respective PNF/VNF's maybe made, and the required service may be activated (212). The configurations detail maybe stored to the Configuration/Policy Management Data store (213). The activated service may also be verified to check if the activation is successful. If the verification is successful, Service Level Validation Flow maybe triggered (213).

Figure 2B:
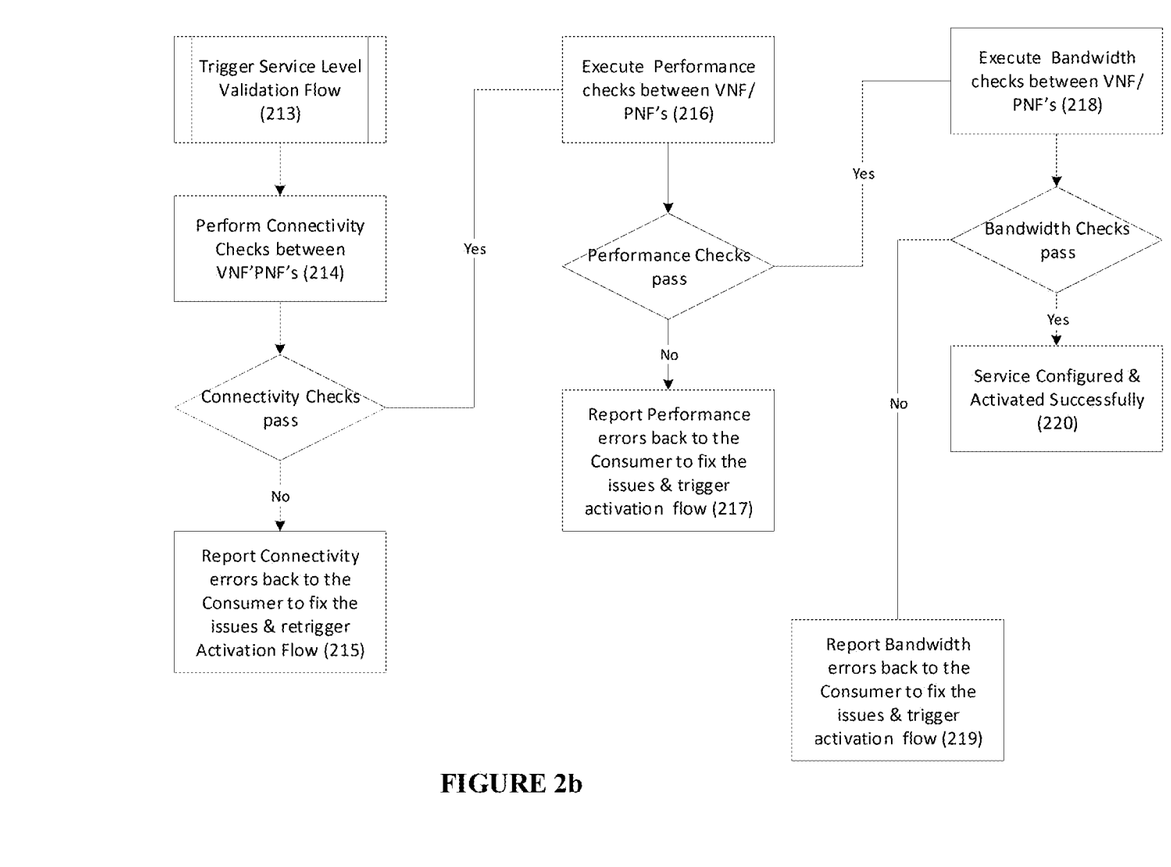
FIG. 2b is a flowchart of an example of validation steps of an embodiment of the process described herein.

As explained in FIG. 2b, in one embodiment, the service level validation flow (213) may include connectivity validations (214), performance validations (216), and bandwidth validations (218) between VNF/PNF. In case of any of the validation failures, the error notice is sent to the user to fix the issues (215, 217, 219) and restart the process. When the validation is successful, the service is configured and activated successfully (220).

In an embodiment, if the service activation verification, or if the stability connection to the VNF/PNF fails, the user maybe notified to correct the errors. In one embodiment the error may be related to Interface configuration errors. The other errors may be policy configuration errors and routing errors. The errors may be fixed by correcting the data from inventory/configuration & policy templates. The error may also be related to connectivity issues.

Accordingly, the Virtualized Network Activation Service Framework with one touch automation will help in applying the service level configurations on the VNF's deployed using orchestrators, physical devices (in case of hybrid networks) and carry out the end to end service diagnostics. The Virtualized Network Activation Service Framework also exposes generic API's with industry standards which would help in automation of service level configurations by integrating with OSS/BSS (Operations Support Systems/Business Support Systems).

The flow of an example of the process disclosed here is shown in FIG. 4a to FIG. 4e.

Figure 4A:
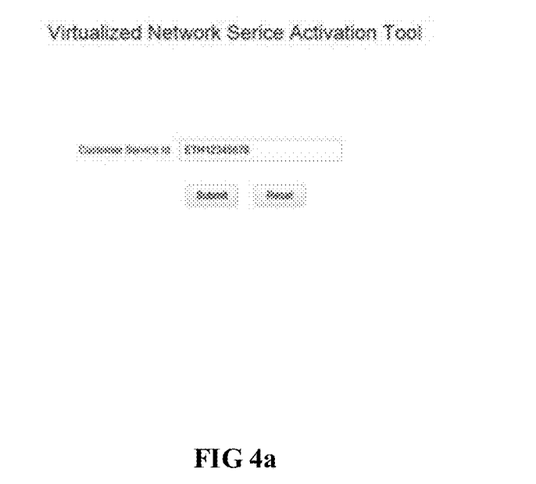
FIG. 4a is an example of service ID entered by a user.
Figure 4B:
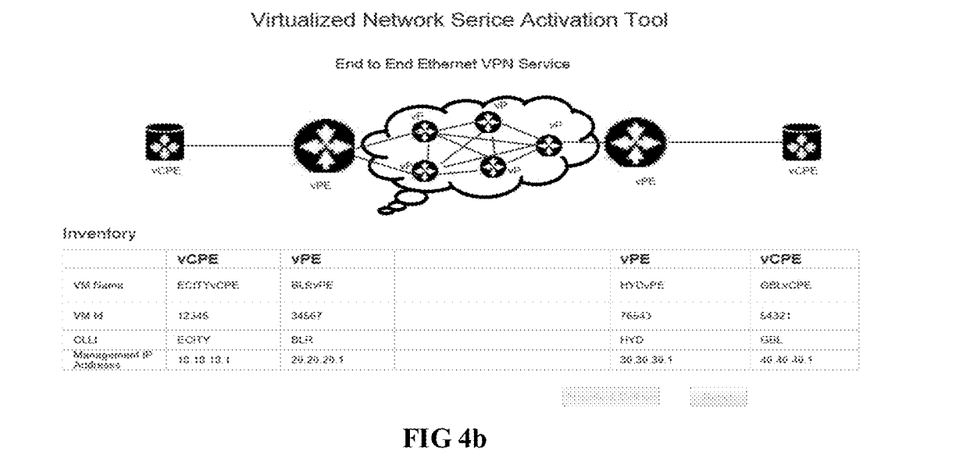
FIG. 4b is a Virtualized service topology view.

In FIG. 4a, the user enters the service ID for which he needs end to end activation over a virtual network. The system retrieves the topology and other relevant detail corresponding to the service ID. FIG. 4b displays the inventory details and topology fetched against the service ID provided.

Figure 4C:
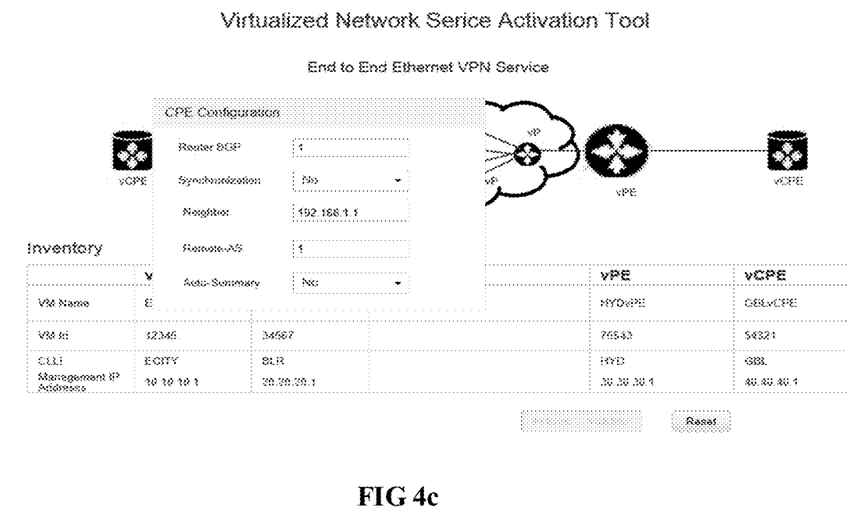
FIG. 4c is a Configuration of Virtualized Network Functions (vCPE)
Figure 4D:
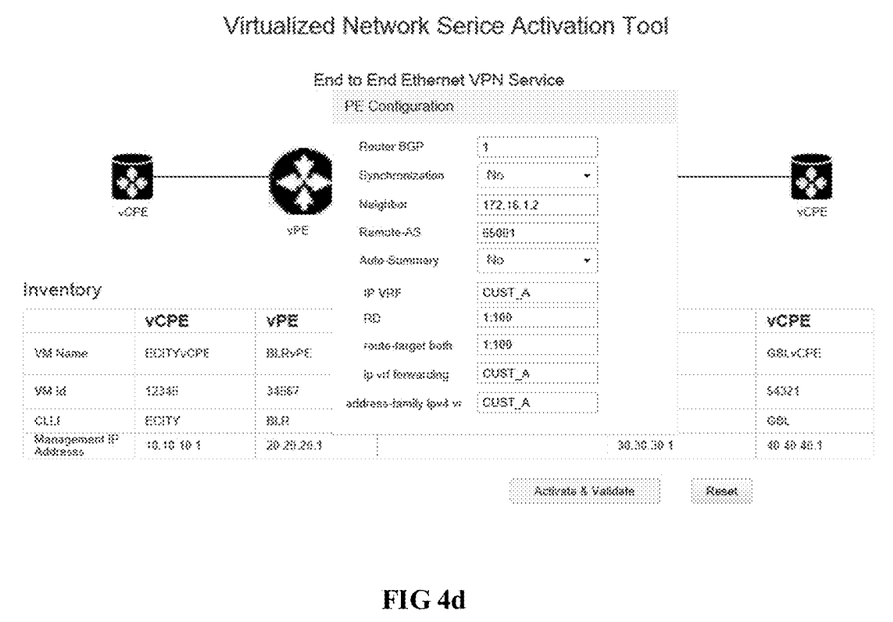
FIG. 4d is a Configuration of Virtualized Network Functions (vPE)

FIGS. 4c and 4d shows the CPE configuration and PE configuration which were extracted from the values in the service ID, and fetched from the configuration template as well. These are the Customer Premise Equipment & Provider Edge equipment and may be retrieved from the inventory System (303) as well as the configuration/policy/validation data store (304).

Figure 4E:
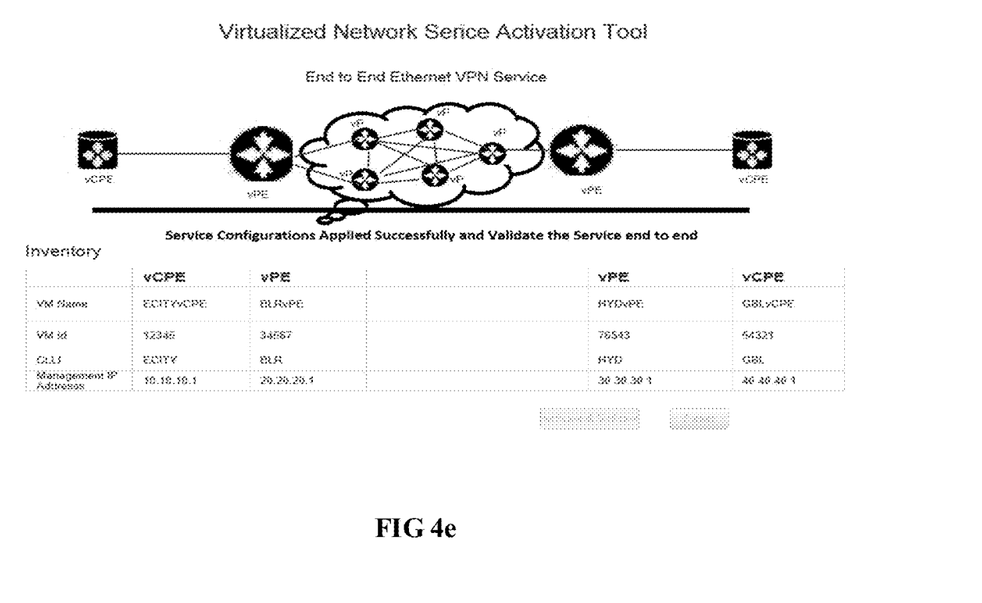
FIG. 4e is a Virtualized Service Activated & Tested end to end.

FIG. 4e shows the activated and end to end tested service, after all the validations and configurations as explained in the figures above.

Having thus described the basic concept of the disclosure, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosure. Additionally, the recited order of processing elements or sequences, or the use of numbers, letters, or other designations therefore, is not intended to limit the claimed processes to any order except as may be specified in the claims. Accordingly, the disclosure is limited only by the following claims and equivalents thereto.

What is claimed is:

1. A system comprising one or more computing devices for implementing an architecture for activation of virtual network service, comprising:
   at least one processor coupled to at least one memory containing a machine readable medium comprising machine executable code having stored thereon instructions, the processor configured to execute the machine executable code to cause the processor to:
   parse a request received from a client machine into one or more child templates;
   apply a predefined configuration on one or more vendor network systems of a virtual network service, using orchestrators, wherein the predefined configuration, the vendor network system and the virtual network service are extracted from one or more of the child templates;
   perform at least a two phase diagnostic check of a state of one or more load limits of components and of a performance service level of one or more devices of the vendor network system based on parameter values submitted with the request;
   perform a healing function on the vendor network system based on the two phase diagnostic check;
   perform a verification of the virtual network service; and
   activate the virtual network service based on the verification and the diagnosis.

2. The system of claim 1, wherein the processor is further configured to execute the machine executable code to cause the processor to:
   validate syntax and topology of the virtual network service for the request.

3. The system as claimed in claim 1, wherein the processor is further configured to execute the machine executable code to cause the processor to:
   create one or more templates comprising configuration for the vendor network system, by retrieving corresponding configuration details from an inventory.

4. The system as claimed in claim 3, wherein the processor is further configured to execute the machine executable code to cause the processor to:
   convert the created templates into data models supported by the vendor network system, and
   apply the data models to the vendor network system.

5. The system as claimed in claim 1, wherein the processor is further configured to execute the machine executable code to cause the processor to:
   diagnosis the vendor network system,
   verify a state of the vendor network system,
   verify a service parameter of the vendor network system, and
   check the network system based on the diagnosis.

6. The system as claimed in claim 1, wherein the request comprises configuration details of the one or more service and the one or more vendor network systems.

7. The system as claimed in claim 1, wherein the perform at least a two phase diagnostic check and perform the healing function further comprise:
   conduct a validation on connectivity checks between the one or more vendor network systems and the virtual network service;
   perform a validation on performance checks between the one or more vendor network systems and the virtual network service;
   conduct a validation on bandwidth checks between the one or more vendor network systems and the virtual network service; and
   perform a healing on the virtual network service based on the validations on connectivity checks, performance checks and bandwidth checks.

8. A non-transitory computer readable medium having stored thereon instructions for moderating one or more images comprising executable code which when executed by one or more processors, causes the one or more processors to:
   parse a request received from a client machine into one or more child templates;
   apply a predefined configuration on one or more vendor network systems of a virtual network service, using orchestrators, wherein the predefined configuration, the vendor network system and the virtual network service are extracted from one or more of the child templates;
   perform at least a two phase diagnostic check of a state of one or more load limits of components and of a performance service level of one or more devices of the vendor network system based on parameter values submitted with the request;

perform a healing function on the vendor network system based on the two phase diagnostic check;

perform a verification of the virtual network service; and activate the virtual network service based on the verification and the diagnosis.

9. The non-transitory computer readable medium of claim 8, wherein the executable code when executed by the one or more processors further causes the one or more processors to:

validate syntax and topology of the virtual network service for the request.

10. The non-transitory computer readable medium of claim 8, wherein the executable code when executed by the one or more processors further causes the one or more processors to:

create one or more templates comprising configuration for the vendor network system, by retrieving corresponding configuration details from an inventory.

11. The non-transitory computer readable medium of claim 8, wherein the executable code when executed by the one or more processors further causes the one or more processors to:

convert the created templates into data models supported by the vendor network system, and apply the data models to the vendor network system.

12. The non-transitory computer readable medium of claim 8, wherein the executable code when executed by the one or more processors further causes the one or more processors to:

diagnosis the vendor network system, verify a state of the vendor network system, verify a service parameter of the vendor network system, and check the network system based on the diagnosis.

13. The non-transitory computer readable medium of claim 8, wherein the request comprises configuration details of the one or more vendor network systems.

14. The non-transitory computer readable medium of claim 8, wherein for the perform at least a two phase diagnostic check and perform the healing function, the executable code when executed by the one or more processors further causes the one or more processors to:

conduct a validation on connectivity checks between the one or more vendor network systems and the virtual network service;

perform a validation on performance checks between the one or more vendor network systems and the virtual network service;

conduct a validation on bandwidth checks between the one or more vendor network systems and the virtual network service; and perform a healing on the virtual network service based on the validations on connectivity checks, performance checks and bandwidth checks.

15. A method comprising:

parsing, by a computing device, a request received from a client machine into one or more child templates;

applying, by the computing device, a predefined configuration on one or more vendor network systems of a virtual network service, using orchestrators, wherein the predefined configuration, the vendor network system and the virtual network service are extracted from one or more of the child templates;

performing, by the computing device, at least a two phase diagnostic check of a state of one or more load limits of components and of a performance service level of one or more devices of the vendor network system based on parameter values submitted with the request;

performing, by the computing device, a healing function on the vendor network system based on the two phase diagnostic check;

performing, by the computing device, a verification of the virtual network service; and activating, by the computing device, the virtual network service based on the verification and the diagnosis.

16. The method of claim 15 further comprising:

validating, by the computing device, syntax and topology of the virtual network service for the request.

17. The method of claim 15 further comprising:

creating, by the computing device, one or more templates comprising configuration for the vendor network system, by retrieving corresponding configuration details from an inventory.

18. The method of claim 15 further comprising:

converting, by the computing device, the created templates into data models supported by the vendor network system, and applying, by the computing device, the data models to the vendor network system.

19. The method of claim 15 further comprising:

diagnosing, by the computing device, the vendor network system, verifying, by the computing device, a state of the vendor network system, verifying, by the computing device, a service parameter of the vendor network system, and checking, by the computing device, the network system based on the diagnosis.

20. The method of claim 15 wherein for the performing at least a two phase diagnostic check and performing the healing function, the method further comprises:

conducting, by the computing device, a validation on connectivity checks between the one or more vendor network systems and the virtual network service;

performing, by the computing device, a validation on performance checks between the one or more vendor network systems and the virtual network service;

conducting, by the computing device, a validation on bandwidth checks between the one or more vendor network systems and the virtual network service; and performing, by the computing device, a healing on the virtual network service based on the validations on connectivity checks, performance checks and bandwidth checks.

* * * * *